US008935337B2

(12) United States Patent
Choi et al.

(10) Patent No.: US 8,935,337 B2
(45) Date of Patent: Jan. 13, 2015

(54) PROACTIVE NOTIFICATION OF AVAILABILITY STATUS IN EMAIL COMMUNICATION SYSTEMS (75) Inventors: Christopher Young-Soo Choi, Southport (AU); Neil Ian Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 1094 days.

(21) Appl. No.: 12/366,021

(22) Filed: Feb. 5, 2009

(65) Prior Publication Data

US 2010/0198921 A1    Aug. 5, 2010

(51) Int. Cl.
*G06F 15/16* (2006.01)
*G06Q 10/10* (2012.01)
*H04L 12/58* (2006.01)
*H04M 1/725* (2006.01)

(52) U.S. Cl.
CPC .............. *G06F 15/16* (2013.01); *G06Q 10/107* (2013.01); *H04L 51/08* (2013.01); *H04M 1/72547* (2013.01); *G06Q 10/109* (2013.01)
USPC ............................ 709/206; 709/207; 709/238

(58) Field of Classification Search
None
See application file for complete search history.

(56) References Cited

U.S. PATENT DOCUMENTS

| | | | | |
|---|---|---|---|---|
| 5,818,447 | A * | 10/1998 | Wolf et al. ..................... | 715/752 |
| 6,385,627 | B1 * | 5/2002 | Cragun .......................... | 715/273 |
| 6,526,436 | B1 * | 2/2003 | Shiraishi et al. .............. | 709/206 |
| 6,757,714 | B1 * | 6/2004 | Hansen .......................... | 709/206 |
| 7,130,886 | B2 * | 10/2006 | Little et al. .................... | 709/206 |
| 7,136,898 | B1 * | 11/2006 | Chisaki et al. ................ | 709/206 |
| 7,380,126 | B2 * | 5/2008 | Logan et al. .................. | 713/176 |
| 7,548,952 | B2 * | 6/2009 | Delia et al. .................... | 709/206 |
| 2001/0042102 | A1 * | 11/2001 | Inamori et al. ................ | 709/206 |
| 2002/0078158 | A1 * | 6/2002 | Brown et al. ................. | 709/206 |
| 2002/0156852 | A1 * | 10/2002 | Hughes et al. ................ | 709/206 |
| 2002/0184321 | A1 * | 12/2002 | Fishman et al. .............. | 709/206 |
| 2003/0065742 | A1 * | 4/2003 | Culp et al. ..................... | 709/218 |
| 2003/0097361 | A1 * | 5/2003 | Huang et al. ................... | 707/10 |
| 2004/0039630 | A1 * | 2/2004 | Begole et al. ................... | 705/11 |
| 2004/0054887 | A1 * | 3/2004 | Paulsen et al. ................ | 713/154 |
| 2004/0088362 | A1 * | 5/2004 | Curbow et al. ............... | 709/207 |
| 2004/0111478 | A1 * | 6/2004 | Gross et al. ................... | 709/206 |
| 2004/0181581 | A1 * | 9/2004 | Kosco ........................... | 709/206 |
| 2005/0021645 | A1 | 1/2005 | Kulkarni et al. | |
| 2005/0114453 | A1 * | 5/2005 | Hardt ............................ | 709/206 |
| 2005/0204008 | A1 * | 9/2005 | Shinbrood ..................... | 709/206 |
| 2006/0031327 | A1 * | 2/2006 | Kredo ............................ | 709/206 |
| 2006/0041625 | A1 * | 2/2006 | Chen et al. .................... | 709/206 |
| 2007/0067402 | A1 * | 3/2007 | Sugii et al. .................... | 709/206 |
| 2007/0143412 | A1 * | 6/2007 | Qi .................................. | 709/206 |
| 2007/0185962 | A1 * | 8/2007 | Bocking et al. ............... | 709/206 |
| 2007/0208853 | A1 * | 9/2007 | Yang ............................. | 709/225 |
| 2007/0233788 | A1 * | 10/2007 | Bender ......................... | 709/206 |
| 2007/0244976 | A1 * | 10/2007 | Carroll et al. ................. | 709/206 |
| 2008/0091785 | A1 * | 4/2008 | Pulfer et al. ................... | 709/206 |

(Continued)

Primary Examiner — Ian N Moore
Assistant Examiner — Dung B Huynh
(74) Attorney, Agent, or Firm — Yee & Associates, P.C.; Jeffrey S. LaBaw (57) ABSTRACT A computer implemented method, a tangible computer medium, and a data processing system proactively share current and upcoming schedule information. When the data processing system detects an outgoing e-mail from an e-mail client; a calendar entry is retrieved from a calendar application. The calendar entry indicates an availability of a user of the e-mail client. The calendar entry is attached to the outgoing e-mail, and the e-mail client then sends the outgoing e-mail.

13 Claims, 4 Drawing Sheets

(56) References Cited

U.S. PATENT DOCUMENTS

| | | |
|---|---|---|
| 2008/0148154 A1 | 6/2008 | Burrell et al. |
| 2008/0162649 A1* | 7/2008 | Lee et al. .................... 709/206 |
| 2008/0263162 A1* | 10/2008 | Staiman et al. ............. 709/206 |
| 2009/0113002 A1* | 4/2009 | Zellner et al. ............... 709/206 |
| 2009/0217028 A1* | 8/2009 | Khan et al. .................. 713/150 |
| 2009/0292776 A1* | 11/2009 | Nesbitt et al. ............... 709/206 |
| 2010/0049812 A1* | 2/2010 | Brown et al. ................ 709/206 |
| 2010/0161683 A1* | 6/2010 | Leeds et al. ................. 707/803 |

* cited by examiner

PROACTIVE NOTIFICATION OF AVAILABILITY STATUS IN EMAIL COMMUNICATION SYSTEMS

BACKGROUND OF THE INVENTION

1. Field of the Invention

The present invention relates generally to a computer implemented method, a computer program product, and a data processing system. More specifically, the present invention relates generally to a computer implemented method, a computer program product, and a data processing system for proactive notification of availability status in an e-mail communication system.

2. Description of the Related Art

The Internet is a global network of computers and networks joined together by gateways that handle data transfer and the conversion of messages from a protocol of a sending network to a protocol used by a receiving network. On the Internet, any computer may communicate with any other computer. Information between computers travels over the Internet through a variety of languages also referred to as protocols. The set of protocols used on the Internet is called the Transmission Control Protocol/Internet Protocol (TCP/IP).

The Internet has revolutionized communications and commerce as well as being a source of information and entertainment. For many users, e-mail is a widely used format to communicate over the Internet. It is commonplace for users to send e-mail messages to other users through the Internet.

The use of e-mail messages is commonplace for personal and business use. E-mail messages are used by individuals to keep in touch with and communicate with other users. Additionally, e-mail messages provide a medium to collaborate and exchange documents.

E-mail systems provide a method for a notification of availability status to be sent in response to incoming e-mail to a user. This notification is commonly called the "out of office" feature. Implementations such as IBM® Lotus Notes® provide a lot of flexibility in how out-of-office can be configured, with features such as start and end date for out-of-office notification, different out-of-office messages for different collections of users, and flexibility and personalization in how the out-of-office notification is expressed.

Existing out-of-office solutions employ a reactive notification. The participants only become aware of their counterparts being away when they send an e-mail and receive an out-of-office message. It is possible that the sender has invested much effort and some degree of urgency in writing an e-mail without realizing the recipient is unavailable. This often leads to decreased productivity as well as unnecessary use of resources such as network bandwidth and storage.

BRIEF SUMMARY OF THE INVENTION

According to one embodiment of the present invention, a computer implemented method, a tangible computer medium, and a data processing system are provided for proactively sharing current and upcoming schedule information. When the data processing system detects an outgoing e-mail from an e-mail client; a calendar entry is retrieved from a calendar application. The calendar entry indicates an availability of a user of the e-mail client. The calendar entry is attached to the outgoing e-mail, and the e-mail client then sends the outgoing e-mail.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
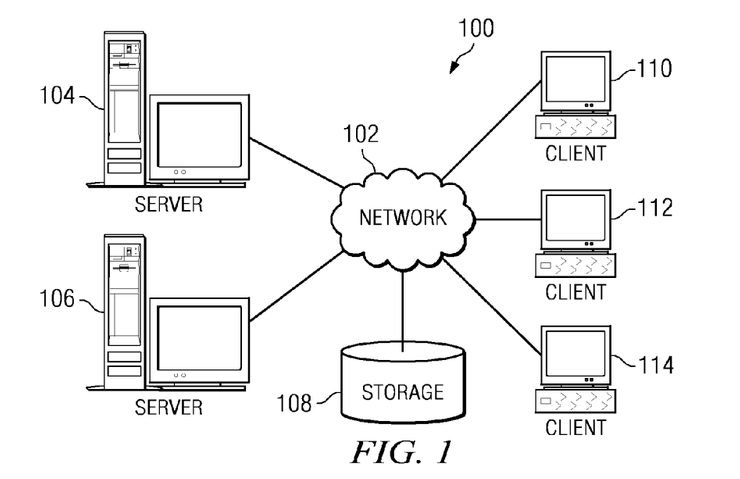
FIG. 1 is a pictorial representation of a network of data processing systems in which illustrative embodiments may be implemented.
Figure 2:
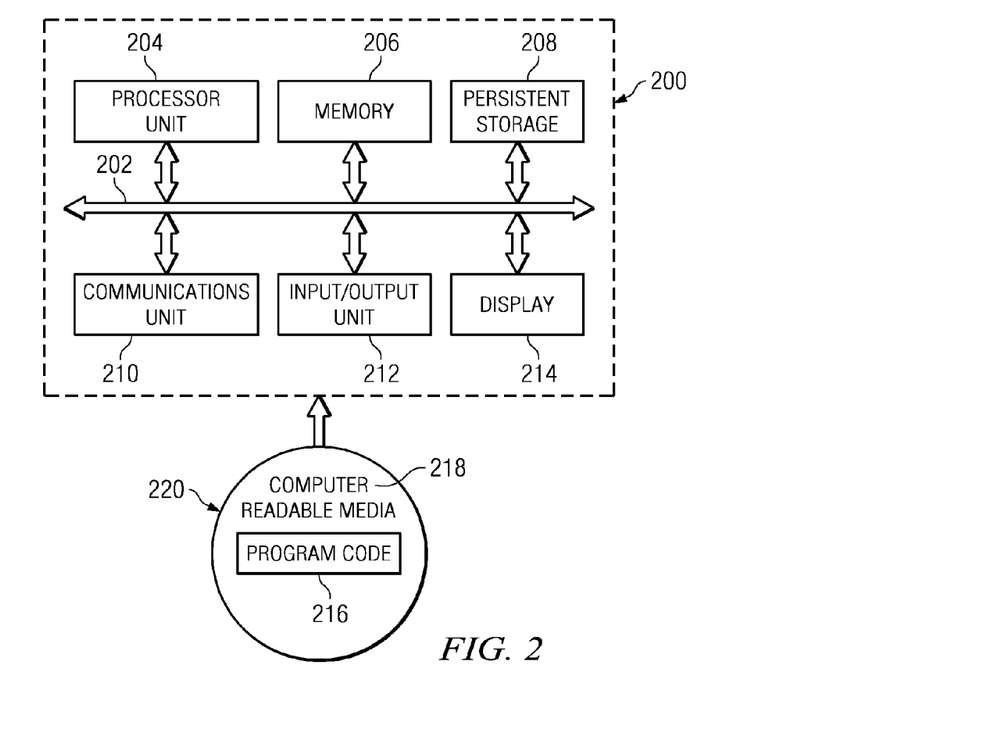
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include inorganic components integrated with organic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
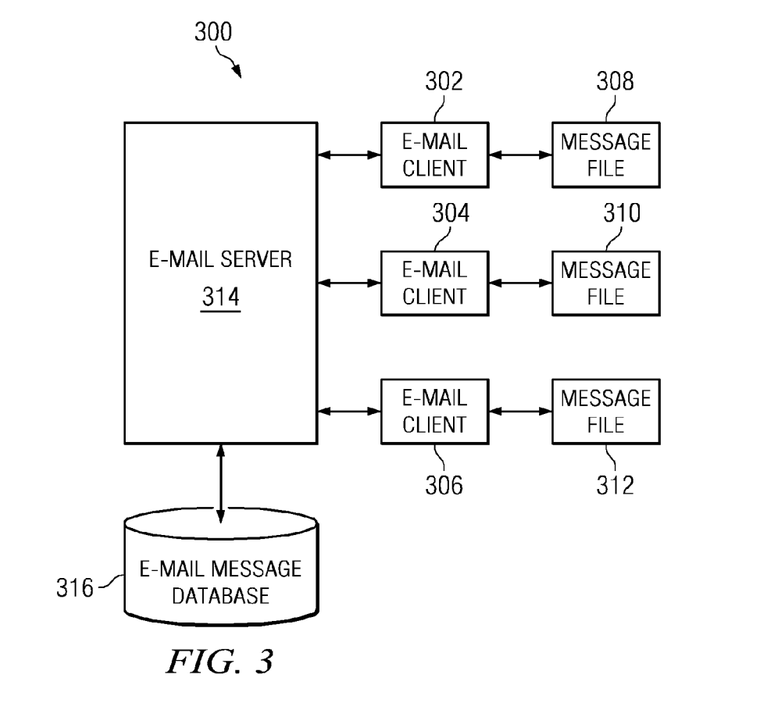
FIG. 3 is a diagram illustrating an e-mail messaging system in accordance with an illustrative embodiment.

Turning now to FIG. 3, a diagram illustrating an e-mail messaging system is depicted in accordance with an illustrative embodiment. In this example, e-mail messaging system 300 includes e-mail client 302, e-mail client 304, and e-mail client 306, which are programs or applications located at different client data processing systems, such as client 110, client 112, and client 114 in FIG. 1. Message file 308, message file 310, and message file 312 are associated with these e-mail clients. These message files store e-mail messages received by the clients and may be organized into various mailboxes. Examples of various mailboxes include, for example, an in folder, a sent folder, a deleted folder, and an outbox folder.

These e-mail programs may employ different protocols depending upon the implementation. For example, simple mail transfer protocol (SMTP) is a standard e-mail protocol that is based on TCP/IP. This protocol defines a message format and the message transfer agent which stores and forwards the mail. Other protocols, such as post office protocol 3 (POP3), also may be employed.

These e-mail programs are used to send e-mails back and forth to different users through e-mail server 314. Messages sent to other e-mail clients are stored in e-mail message database 316. When an e-mail client connects to e-mail server 314, any messages for that particular client are then sent to the client. E-mail clients 302, 304, and 306 may be implemented using presently available e-mail clients.

The illustrative embodiments herein provide a method and system for proactively sharing an individual's current and upcoming schedule information with others by providing advance notifications of planned unavailability. Integration between calendar and e-mail components allows an individual's calendar entries to be piggybacked on e-mails sent.

A computer implemented method, a tangible computer medium, and a data processing system are provided for proactively sharing current and upcoming schedule information. When the data processing system detects an outgoing e-mail from an e-mail client; a calendar entry is retrieved from a calendar application. The calendar entry indicates an availability of a user of the e-mail client. The calendar entry is attached to the outgoing e-mail, and the e-mail client then sends the outgoing e-mail.

Figure 4:
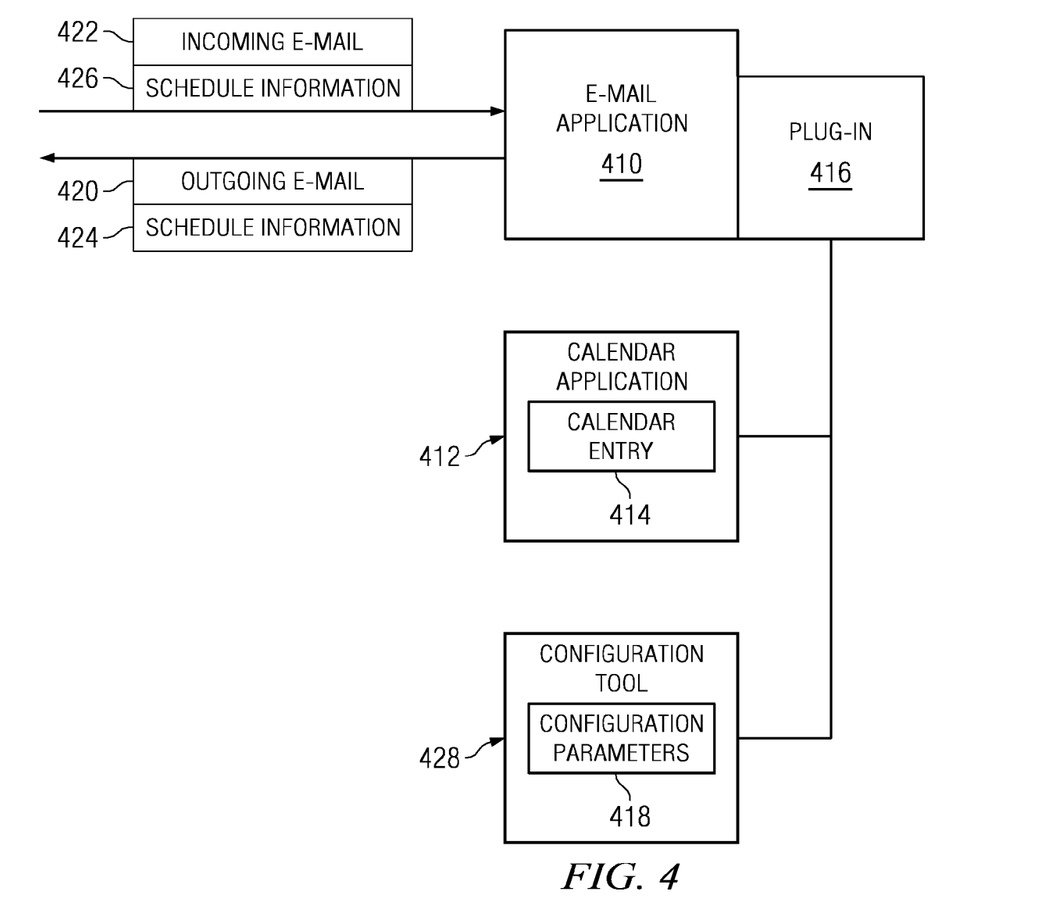
FIG. 4 is dataflow for proactive notification of availability status in e-mail communication systems according to an illustrative embodiment.

Referring now to FIG. 4, a dataflow for proactive notification of availability status in e-mail communication systems is shown according to an illustrative embodiment. The dataflow of FIG. 4 can be implemented in conjunction with an e-mail client, such as e-mail clients 302, 304, or 306 of FIG. 3.

E-mail application 410 is a program, such as one of e-mail clients 302, 304, or 306 of FIG. 3, that is used to send e-mails back and forth to different users through an e-mail server. E-mail application 410 resides on a client, such as one of client 110, client 112, and client 114 in FIG. 1.

Calendar application 412 is a software application that keeps schedule and appointment information for the user. Calendar application 412 can be implemented as part of a software suite, such as for example, but not limited to, Lotus Notes or Microsoft Outlook. Conversely, calendar application 412 can be implemented as a stand-alone application. Calendar application 412 contains calendar entry 414. Calendar entry 414 is a schedule, appointment, prior arrangement recorded in calendar application 412.

Plug-in 416 is a software application that works in conjunction with e-mail application 410 and calendar application 412. Plug-in 416 can be implemented as part of a software suite, such as for example, but not limited to, Lotus Notes or Microsoft Outlook. Conversely, plug-in 416 can be implemented as a plug-in application that interacts with the host application e-mail application 410. Plug-in 416 embeds current and upcoming schedule information, such as calendar entry 414 or configuration parameters 418, in outgoing e-mail 420. Similarly, plug-in 416 parses incoming e-mail 422 current and upcoming schedule information sent from other e-mail users. Plug-in 416 can then update calendar application 412 to include current and upcoming schedule information as a new calendar entry, such as calendar entry 414.

Plug-in 416 appends schedule information 424 to outgoing e-mail 420. Schedule information 424 is one or more calendar entry, such as calendar entry 414, parsed from calendar application 412. In an illustrative embodiment, plug-in 416 passively appends schedule information 424 to each outgoing e-mail 420, without additional action required by the user. When a user attempts to send an e-mail, plug-in 416 parses calendar application 412 of the user for calendar entry 414. Plug-in 416 then appends schedule information 424 to outgoing e-mail 420. Outgoing e-mail 420 is then sent.

Schedule information 424 can be attached to outgoing e-mail 420 using existing e-mail protocols such as, for example, but not limited to simple mail transfer protocol. In an illustrative embodiment, existing e-mail protocols could be extended so that the schedule information 424 can be included in header information of outgoing e-mail 420. In this embodiment, the header name and the format of schedule information 424 could be standardized in order to allow better interoperability between different e-mail applications.

In another illustrative embodiment, existing e-mail applications could include schedule information 424 in the body of outgoing e-mail 420 in some agreed way that can be reliably parsed by the e-mail applications. In such an embodiment, schedule information 424 could be included in the body of outgoing e-mail 420 as, for example, but not limited to, extensible markup language code.

Plug-in 416 also parses incoming e-mail 422 for schedule information 426 sent from another user. Schedule information 426 is current and upcoming schedule information and availability sent from other e-mail users. Responsive to receiving incoming e-mail 422 having schedule information 426, plug-in 416 creates a new calendar entry, such as calendar entry 414. The new calendar entry lists the upcoming schedule information and availability of the other e-mail user whom sent e-mail 422.

Configuration tool 428 is a software component that allows a user to configure configuration parameters 418. Configuration parameters 418 are those parameters that determine whether calendar entry 414 should be attached to outgoing e-mail 420 as schedule information 424. Configuration parameters 418 can include types of events to be shared. Any event that hinders the sender's ability to communicate actively should be considered. For example, out-of-office, training and all-day meetings. When utilizing the built-in calendar, such as calendar application 412, this configuration can rely on the categorization provided by the calendar application. Configuration parameters 418 can also include the timeframe in which the pro-active notifications are to be issued. For example, but not limited to, schedule information 424 should be attached to outgoing e-mail 420 two weeks prior to an out-of-office event or 1 day before an all-day meeting event.

Figure 5:
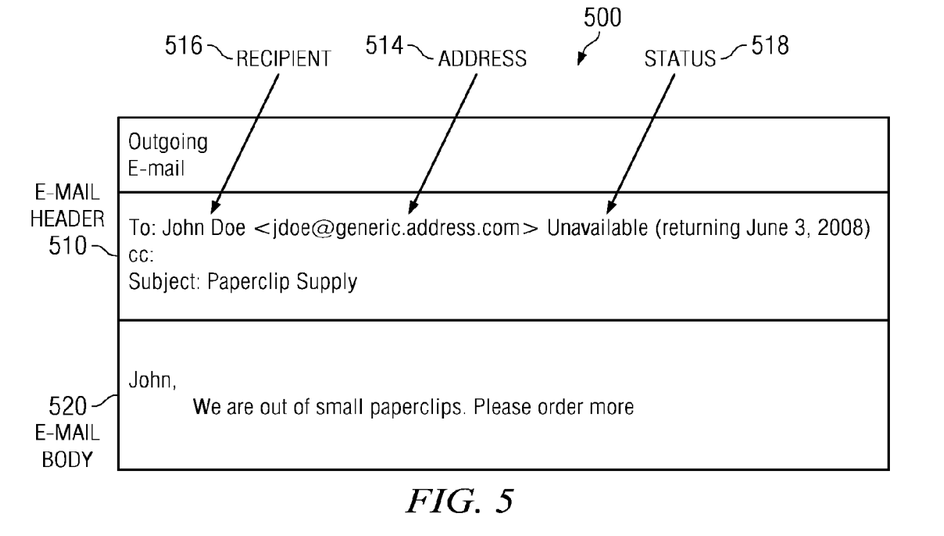
FIG. 5 is a screenshot of an outgoing e-mail according to an illustrative embodiment.

Referring now to FIG. 5, a screenshot of an outgoing e-mail is shown according to an illustrative embodiment. Outgoing e-mail 500 can be outgoing e-mail 420 of FIG. 4.

Outgoing e-mail 500 includes e-mail header 510, and e-mail body 520. E-mail header 510 is the routing information, including the mail address, used to deliver outgoing e-mail 500 to its intended recipients. E-mail header 510 shows only that portion of the header that is visible to the sending client or receiving client. As outgoing e-mail 500 is routed through an e-mail system to its ultimate destination, routing information is appended into a hidden portion of e-mail header 510.

In one illustrative embodiment, protocols for outgoing e-mail 500 could be extended so that schedule information, such as schedule information 424 of FIG. 4, can be included in header information of outgoing e-mail 420. Preferably, schedule information could be included in the hidden portion of e-mail header 510. In this embodiment, the header name and the format of schedule information 424 can be standardized in order to allow better interoperability between different e-mail applications.

E-mail body 520 contains text or other information that the sender wishes to communicate to the recipient. In another illustrative embodiment, existing e-mail applications could include schedule information, such as schedule information 424 of FIG. 4, in e-mail body 520 of outgoing e-mail 500. The schedule information is incorporated into e-mail body 520 such that the schedule information can be reliably parsed by the e-mail applications. In such an embodiment, the schedule information could be included into e-mail body 520 as, for example, but not limited to, as extensible markup language code.

E-mail header 510 includes address 514. Address 514 is the e-mail address for the recipient 516 of outgoing e-mail 500. In one illustrative embodiment, e-mail header 510 also includes status 518. Status 518 is an extension of the user interface of the e-mail application that displays status headers for recipient 516 when outgoing e-mail 500 is viewed. The status headers can include, for example, but are not limited to, available, unavailable, and unknown. The status headers can include when the status of recipient 516 will change, and what the future status might be. For example, the status headers may indicate when recipient 516 will be back in the office or when recipient 516 will go on leave.

In an illustrative embodiment, e-mail header 510 can include the use color coding to help the users easily identify the status and upcoming status changes for recipient 516. For example, but not limited to, display of recipient 516 in a green font color may indicate that recipient 516 is currently available. Display of recipient 516 in a yellow font color may indicate that recipient 516 is currently available but will become unavailable at some time in the near future. Display of recipient 516 in a red font color may indicate that recipient 516 is currently unavailable. Display of recipient 516 in an orange font color may indicate that recipient 516 is currently unavailable but will become available at some time in the near future.

It is appreciated that while FIG. 5 depicts an outgoing e-mail, such is for illustrative purposes only. Status 518 can also be employed within incoming e-mail, such as incoming e-mail 422 of FIG. 4. In such incoming e-mails, addresses and statuses of the e-mail sender can be included within the header or body of the e-mail, similar to the incorporation of the recipient addresses and statuses shown in outgoing e-mail 500.

Figure 6:
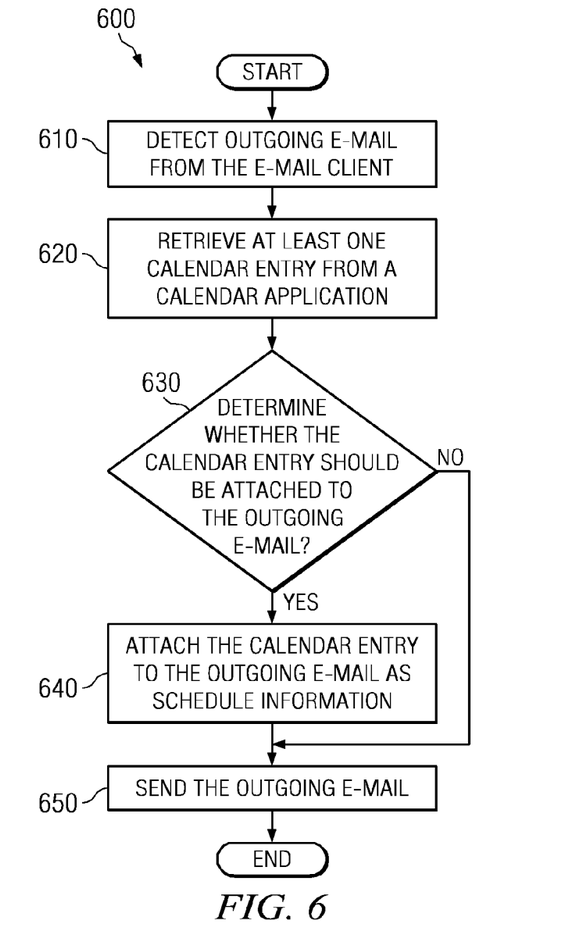
FIG. 6 is a flowchart for attaching schedule information to an outgoing e-mail according to an illustrative embodiment.

Referring now to FIG. 6 a flowchart for attaching schedule information to an outgoing e-mail is shown according to an illustrative embodiment. Process 600 is a software process, executing on a software component, such as plug-in 416 of FIG. 4.

Process 600 begins by detecting an outgoing e-mail from the e-mail client (step 610). The outgoing e-mail can be outgoing e-mail 420 of FIG. 4. The e-mail client can be e-mail application 410 of FIG. 4.

Responsive to detecting an outgoing e-mail from the e-mail client, process 600 retrieves at least one calendar entry from a calendar application (step 620). The calendar entries can be calendar entry 414 of FIG. 4. Process 600 then determines whether the calendar entry should be attached to the outgoing e-mail (step 630). Generally, the calendar entry should be attached to the outgoing e-mail if the calendar entry meets the configuration parameters, such as configuration parameters 418 of FIG. 4.

Responsive to determining that the calendar entry should be attached to the outgoing e-mail, process 600 attaches the calendar entry to the outgoing e-mail as schedule information (step 640). The schedule information can be schedule information 424 of FIG. 4. Process 600 then sends the outgoing e-mail (step 650), with the process terminating thereafter.

Returning now to step 640, responsive to determining that the calendar entry should be attached to the outgoing e-mail, process 600 sends the outgoing e-mail (step 650), with the process terminating thereafter. Because the calendar entry does not meet the configuration parameters, the calendar entry is not attached to the outgoing e-mail. The outgoing e-mail is instead sent without the schedule information.

Figure 7:
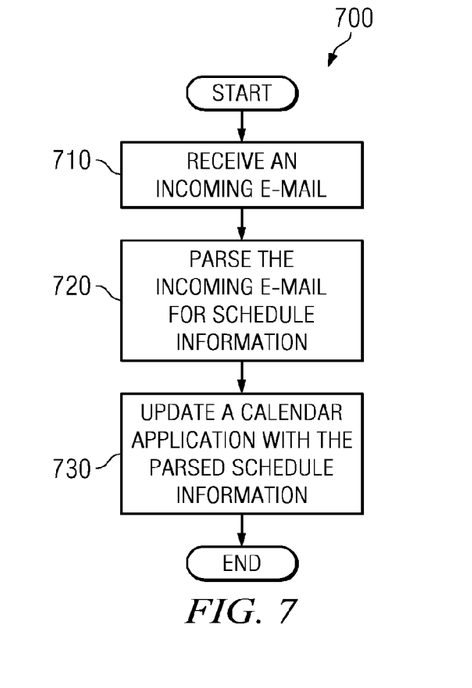
FIG. 7 is a flowchart for parsing schedule information from an incoming e-mail according to an illustrative embodiment.

Referring now to FIG. 7, a flowchart for parsing schedule information from an incoming e-mail is shown according to an illustrative embodiment. Process 700 is a software process, executing on a software component, such as plug-in 416 of FIG. 4.

Process 700 begins by receiving an incoming e-mail (step 710). The incoming e-mail can be incoming e-mail 422 of FIG. 4.

Responsive to receiving the incoming e-mail, process 700 parses the incoming e-mail for schedule information (step 720). The schedule information can be schedule information 426 of FIG. 4. The schedule information is current and upcoming schedule information and availability sent from other e-mail users. Schedule information is attached to the incoming e-mail using existing e-mail protocols such as, for example, but not limited to simple mail transfer protocol. In an illustrative embodiment, existing e-mail protocols are extended so that the schedule information is included in header information of the incoming e-mail. The header name and the format of the schedule information can be standardized in order to allow better interoperability between different e-mail applications.

Responsive to parsing the incoming e-mail for schedule information, process 700 then updates a calendar application with the parsed schedule information (step 730), with the process terminating thereafter. Process 700 can update the calendar application by creating a new calendar entry, such as calendar entry 414 of FIG. 4. The new calendar entry lists the upcoming schedule information and availability of the other e-mail user whom sent e-mail.

The illustrative embodiments herein provide a method and system for proactively sharing an individual's current and upcoming schedule information with others by providing advance notifications of planned unavailability. Integration between calendar and e-mail components allows an individual's calendar entries to be piggybacked on e-mails sent.

A computer implemented method, a tangible computer medium, and a data processing system are provided for proactively sharing current and upcoming schedule information. When the data processing system detects an outgoing e-mail from an e-mail client; a calendar entry is retrieved from a calendar application. The calendar entry indicates an availability of a user of the e-mail client. The calendar entry is attached to the outgoing e-mail, and the e-mail client then sends the outgoing e-mail.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for proactively sharing current and upcoming schedule information, the computer implemented method comprising:
   detecting, by a client device, an outgoing e-mail from an e-mail client running on the client device;
   responsive to detecting the outgoing e-mail from the e-mail client, retrieving by the client device at least one calendar entry from a calendar application, wherein the calendar entry indicates an availability of a user of the e-mail client;
   responsive to retrieving at least one calendar entry from a calendar application, the client device determining from a set of user configured configuration parameters whether the calendar entry should be attached to the outgoing e-mail;
   responsive to determining from the set of configuration parameters that the calendar entry should be attached to the outgoing e-mail, the client device attaching the calendar entry to the outgoing e-mail;
   responsive to attaching the calendar entry to the outgoing e-mail, the client device sending the outgoing e-mail with the attached calendar entry from the e-mail client;
   receiving, by the client device, an incoming e-mail from the e-mail client;
   responsive to receiving the incoming e-mail, the client device identifying whether the incoming e-mail contains schedule information;
   responsive to identifying that the incoming e-mail contains schedule information, the client device updating a calendar application with the schedule information; and
   responsive to detecting an outgoing e-mail from an e-mail client, the client device determining and displaying a status for a recipient of the outgoing e-mail in the header of the e-mail using the schedule information in the updated calendar application, wherein the status indicates one or more of the group of an availability of the recipient and an upcoming status change of the recipient.

2. The computer implemented method of claim 1, wherein the step of attaching the calendar entry to the outgoing e-mail further comprises the computer implemented step of:
   attaching the calendar entry to the outgoing e-mail as schedule information included in a header of the outgoing e-mail, wherein the schedule information is attached using an e-mail protocol.

3. The computer implemented method of claim 1, wherein the step of attaching the calendar entry to the outgoing e-mail further comprises the computer implemented step of:
   attaching the schedule information into e-mail body as extensible markup language, wherein the schedule information can be parsed by the e-mail client.

4. The computer implemented method of claim 1, wherein the status for the recipient and a display of the recipient in the outgoing e-mail header is color coded to identify one or more of the group of the status of the recipient and the upcoming status change for recipient.

5. A tangible computer readable hardware medium having a computer program product encoded thereon for sharing current and upcoming schedule information, the computer readable medium comprising:
   computer usable instructions for detecting, by a client device, an outgoing e-mail from an e-mail client running on the client device;
   computer usable instructions, responsive to detecting the outgoing e-mail from the e-mail client, for retrieving by the client device at least one calendar entry from a calendar application, wherein the status entry indicates an availability of a user of the e-mail client;
   computer usable instructions, responsive to retrieving at least one calendar entry from a calendar application, for determining by the client device from a set of user configured configuration parameters whether the calendar entry should be attached to the outgoing e-mail;
   computer usable instructions, responsive to determining from the set of configuration parameters that the calendar entry should be attached to the outgoing e-mail, for attaching by the client device the calendar entry to the outgoing e-mail;

computer usable instructions, responsive to attaching the calendar entry to the outgoing e-mail, for sending by the client device the outgoing e-mail with the attached calendar entry from the e-mail client;

computer usable instructions for receiving by the client device an incoming e-mail from the e-mail client;

computer usable instructions, responsive to receiving the incoming e-mail, for identifying by the client device whether the incoming e-mail contains schedule information;

computer usable instructions, responsive to identifying that the incoming e-mail contains schedule information, for updating by the client device a calendar application with the schedule information; and computer usable instructions, responsive to detecting an outgoing e-mail from an e-mail client, for determining and displaying by the client device a status for a recipient of the outgoing e-mail in the header of the e-mail using the schedule information in the updated calendar application, wherein the status indicates one or more of the group of an availability of the recipient and an upcoming status change of the recipient.

6. The tangible computer readable hardware medium of claim 5, wherein the computer usable instructions for attaching the calendar entry to the outgoing e-mail further comprises:

computer usable instructions for attaching the calendar entry to the outgoing e-mail as schedule information included in a header of the outgoing e-mail, wherein the schedule information is attached using an e-mail protocol.

7. The tangible computer readable hardware medium of claim 5, wherein the computer usable instructions for attaching the calendar entry to the outgoing e-mail further comprises:

computer usable instructions for attaching the schedule information into e-mail body as extensible markup language, wherein the schedule information can be parsed by the e-mail client.

8. The tangible computer readable hardware medium of claim 5, wherein the status for the recipient and a display of the recipient in the outgoing e-mail header is color coded to identify one or more of the group of the status of the recipient and the upcoming status change for recipient.

9. A data processing system comprising:

a bus;

a communications unit connected to the bus;

a memory connected to the bus, wherein the memory includes a computer usable code for proactively sharing current and upcoming schedule information; and a processor unit connected to the bus, wherein the processor unit executes the computer usable code to detect an outgoing e-mail from an e-mail client; responsive to detecting an outgoing e-mail from the e-mail client, to retrieve at least one calendar entry from a calendar application, wherein the status entry indicates an availability of a user of the e-mail client; responsive to retrieving at least one calendar entry from a calendar application, to determine from a set of user configured configuration parameters whether the calendar entry should be attached to the outgoing e-mail; responsive to determining from the set of configuration parameters that the calendar entry should be attached to the outgoing e-mail, to attach the calendar entry to the outgoing e-mail; responsive to attaching the calendar entry to the outgoing e-mail, to send the outgoing e-mail from the e-mail client; to receive an incoming e-mail from the e-mail client; responsive to receiving the incoming e-mail, to identify whether the incoming e-mail contains schedule information; responsive to identifying that the incoming e-mail contains schedule information, to update a calendar application with the schedule information; and responsive to detecting an outgoing e-mail from an e-mail client, to determine and display a status for a recipient of the outgoing e-mail in the header of the e-mail using the schedule information in the updated calendar application, wherein the status indicates one or more of the group of an availability of the recipient and an upcoming status change of the recipient.

10. The data processing system of claim 9, wherein the processor unit executing the computer usable program code to attach the calendar entry to the outgoing e-mail further comprises the processor unit executing the computer usable program code to attach the calendar entry to the outgoing e-mail as schedule information included in a header of the outgoing e-mail, wherein the schedule information is attached using an e-mail protocol.

11. The data processing system of claim 9, wherein the processor unit executing the computer usable program code to attach the calendar entry to the outgoing e-mail further comprises the processor unit executing the computer usable program code to attach the schedule information into e-mail body as extensible markup language, wherein the schedule information can be parsed by the e-mail client.

12. The data processing system of claim 9, wherein the configuration parameters comprise types of events to be shared and a timeframe in which the current and upcoming schedule information is proactively shared.

13. The data processing system of claim 12, further comprising a plug-in module that is operatively coupled between the email client and the calendar application, wherein the plug-in module comprises the computer usable code.

* * * * *